United States Patent [19]

Wegmann et al.

[11] Patent Number: 4,940,516
[45] Date of Patent: Jul. 10, 1990

[54] PROCESS FOR THE PREPARATION OF ELECTROACTIVE LANGMUIR-BLODGETT LAYER SYSTEM

[75] Inventors: Alex Wegmann, Allschwil; Bernd Tieke, Marly; Bruno Hilti, Basel, all of Switzerland

[73] Assignee: Ciba-Geigy Corporation, Ardsley, N.Y.

[21] Appl. No.: 375,758

[22] Filed: Jul. 5, 1989

[30] Foreign Application Priority Data

Jul. 8, 1988 [CH] Switzerland ......................... 2617/88

[51] Int. Cl.$^5$ ................................................ C25B 3/02
[52] U.S. Cl. ................................. 204/14.1; 204/56.1; 204/59 R; 204/59 F; 204/59 QM
[58] Field of Search .................... 204/14.1, 56.1, 59 R, 204/59 F, 59 QM

[56] References Cited

U.S. PATENT DOCUMENTS 4,522,754  6/1985  Hilti et al. ...................... 204/59 F X
4,828,917  5/1989  Wegner et al. ...................... 428/333

FOREIGN PATENT DOCUMENTS

WO 87/4007  7/1987  World Int. Prop. O. .

OTHER PUBLICATIONS

A. Teixier et al., Mol. Cryst. Liqu. Cryst., 120, 319–322 (1985).
J. Roncali Chem. Comm. 1988, 581–582.
J. S. Facci; Langmuir 2, 732–738 (1986).

Primary Examiner—G. L. Kaplan
Attorney, Agent, or Firm—Stephen V. O'Brien

[57] ABSTRACT

A process for the preparation of Langmuir-Blodgett layer systems is described. The process comprises transferring a monolayer to a solid substrate having an electrically conductive surface by applying an electric potential, thereby oxidizing or reducing an electroactive molecule present in the monolayer. The layer systems so obtained can be used, for example, as electrically conductive layers or as sensors.

6 Claims, No Drawings

PROCESS FOR THE PREPARATION OF ELECTROACTIVE LANGMUIR-BLODGETT LAYER SYSTEM

The present invention relates to a process for the electrochemical preparation of electroactive Langmuir-Blodgett layer systems (LB systems), and to the layer systems obtainable by said process.

By means of the process of this invention it is possible to prepare electroactive thin layers which may be used, for example, in the field of electronics or as sensors.

Electrically conductive LB systems are known per se. Thus, for example, in Mol. Cryst. Liq. Cryst. 120, 319–323 (1985), A. Ruaudel-Teixier et al. describe a LB system of an amphiphilic pyridinium TCNQ salt, which is converted into an electrically conductive form by doping with iodine vapour.

LB layer systems of selected metallo-macrocyclic polymers are disclosed in German Offenlegungsschrift No. 3 615 832. In this publication, it is proposed, for example, to enhance the electronic conductivity of the layers by partial oxidation, for example by treatment with iodine vapour or by electrochemical oxidation. These layers are electroactive, i.e. specific redox states result by applying an electric potential.

A process for the preparation of LB layer systems has now been found, which process comprises effecting an electrochemical treatment during the preparation of the LB layer systems. In the process of this invention, the doping and the deposition of the layer are carried out in one step.

Compared with the LB systems obtainable by subsequent treatment with doping agents or by subsequent electrochemical oxidation, the LB layer systems produced by the novel process are distinguished by an enhanced arrangement of the layers.

By means of the process of this invention it is thus possible to obtain a layered structure which is electrically conductive even during the synthesis. In this respect it must be regarded as particularly surprising that the ionic species produced during the transfer step can be applied undecomposed to solid substrates.

A further advantage of the novel process resides in the feature that a large number of counterions can be incorporated in the layer system, thereby enabling the synthesis of layers which cannot be prepared by conventional methods.

In addition, environmentally harmful and corrosive doping agents, for example chlorine or iodine vapour, can be dispensed with in the process of this invention.

Specifically, the present invention relates to a process for the preparation of Langmuir-Blodgett layer systems (LB systems), comprising the steps of (i) preparing a monomolecular layer of an electroactive compound containing a cyclic conjugated $\pi$-system which can be electrochemically oxidised or reduced, or of a mixture of said compound in conjunction with further amphiphilic compounds that are capable of stabilising monomolecular layers, (ii) transferring said layer from a subphase which contains an electrolyte, and into which a counter electrode is dipped, to a solid substrate having an electrically conductive surface by dipping said substrate through the layer so as to effect transfer of the layer to the substrate which is connected as anode or cathode, the potential applied being so chosen that a salt forms from said electroactive compound and counterions of the subphase.

The expression "an electroactive compound containing a cyclic conjugated $\pi$-system which can be electrochemically oxidised or reduced" will be understood as meaning in the context of this description any substance having a cyclic conjugated $\pi$-system which forms a monolayer and which, when incorporated in a LB layer system, can be converted electrochemically into a stable positively or negatively charged state, such that the oxidised or reduced state is, for example, a radical cation or anion or a dication or dianion.

The term "cyclic conjugated $\pi$-system," comprises aromatic and non-aromatic $\pi$-systems as well as carbocyclic or heterocyclic $\pi$-systems.

Exemplary of suitable classes of compounds are monofilm forming annulenes; monolayer forming carbocyclic-aromatic hydrocarbons, such as amphiphilic pyrene or perylene derivatives; monofilm forming heterocyclic-aromatic hydrocarbons such as amphiphilic carbazole and pyrrole derivatives, or tetrathiotetracene or tetraselenotetracene derivatives, as well as tetrathiafulvalene, tetraselenofulvalene, porphyrine, phthalocyanine or tetraazaannulene derivatives.

Suitable counterions for incorporation, together with the cationic forms of the electroactive compounds, in layer systems are virtually all inorganic or organic anions.

Examples of inorganic anions are $ClO_4^-$, $BF_4^-$, $PF_6^-$, $AsF_6^-$, $SbF_6^-$, $SbCl_4^-$, $SbCl_6^-$, $F^-$, $Cl^-$, $Br^-$, $Br_3^-$, $I^-$ or $I_3^-$.

Examples of organic anions are tetracyanoquinodimethane$^-$, tetracyanoethylene$^-$, alkyl sulfate, alkyl sulfonate, alkyl phosphate or alkyl phosphonate, aryl sulfate, aryl sulfonate, aryl phosphate or aryl phosphonate, alkaryl sulfate, alkaryl sulfonate, alkaryl phosphate or alkaryl phosphonate, fluoroalkyl or fluoroalkaryl sulfate, fluoroalkyl or fluoroalkaryl sulfonate, fluoroalkyl or fluoroalkaryl phosphate, or fluroroalkyl or fluoroalkaryl phosphonate, or heteroaryl sulfonates, such as pyrrolopyrrole disulfonate; or polymeric anions such as polyvinylsulfonate, polystyrene sulfonate, polyanethol sulfonate [sulfonated poly(p-methoxy-$\beta$-methylstyrene)] or dextran sulfonate.

Suitable counterions for incorporation, together with the anionic forms of the electroactive compound, in layer systems are virtually all inorganic or organic cations.

Examples of such counterions are metal cations such as $Li^+$, $Na^+$, $K^+$, or $Ag^+$, or organic cations such as alkyl ammonium, alkyl sulfonium, alkyl phosphonium or S-benzyl thiuronium ions.

The prepare monomolecular layers at the water/air interface, a small amount of a solution of the monofilm forming electroactive compound in a preferably low-boiling and water-immiscible solvent is applied to the surface of a water subphase, in a manner known per se, the solvent is allowed to evaporate, and the resultant film is compressed, such that a stable monomolecular layer forms on the surface of the water subphase. The water subphase, on the surface of which the monomolecular layer forms, normally consists of multidistilled or deionised and filtered water to which a conducting salt is added, the anions or cations of which salt are incorporated as counterions in the multilayer system. The conducting salt is normally added to the water subphase in the form of the respective protic acid or of a salt thereof, preferably an alkali metal salt. The concentration of this conducting salt must be sufficient to ensure a reasonable rate of incorporation in the LB multilayer. Concentrations of $10^{-5}$ to $10^{-3}$ per liter are usually sufficient. The saturation concentration of the conducting salt in the respective electrolyte shall be regarded as upper limit.

It is common knowledge that the stability of the films can be influenced by the choice of experimental parameters. Thus, for example, it is possible to stabilise relatively labile films by cooling the subphase, or compounds which are able to stabilise the monomolecular films are used.

Examples of such compounds are long-chain carboxylic acids such as myristic acid, palmitic acid, stearic acid, arachidic acid or behenic acid or the esters, preferably the methyl esters, of these acids; long-chain primary amines such as hexadecylamine, octadecylamine or eicosylamine; long-chain alcohols such as hexadecanol, n-octadecanol or eicosanol; long-chain aliphatic hydrocarbons such as hexadecene, octadecane or eicosane; or steroids and steroid derivatives such as cholesterol. In addition to the saturated derivatives, it is also possible to use derivatives which have ethylenic or acetylenic unsaturation, for example ω-tricosenoic acid or the esters thereof, or amines or alcohols derived therefrom.

Such mixed films normally contain the monofilm forming electroactive compounds in an amount of not less than 1 mol%, based on the total mixture.

Preferably the films will contain 1-95 mol %, most preferably 20-75 mol %, of monofilm forming electroactive compounds in conjunction with further amphiphilic compounds capable of stabilising monomolecular films.

Monomolecular films of film-forming substances or mixtures of such substances can be readily transferred to solid substrates from the surface of the water subphase by the Langmuir-Blodgett technique. This is done by dipping a solid substrate, in a manner known per se, through a water subphase having on the surface thereof a compressed monomolecular film, whereby said film is transferred to the substrate.

Multilayer systems can be prepared by repeated immersion and/or withdrawal of the substrate.

To transfer the monolayer by applying an electric potential, the procedure is to apply a direct current voltage to a solid substrate having an electrically conductive surface and connected as cathode or anode and to dip a counter electrode, for example a gold or platinum wire, into the subphase. The transfer of the monolayer is subsequently carried out by dipping the substrate electrode through the monolayer. The potential is so chosen that it will suffice to effect the oxidation or the reduction in the subphase, for example by degradation of constituents of the subphase. The voltage necessary for the individual case can be determined by the skilled person by spectroscopic methods, as the oxidation or reduction of the compound leads to a change in the absorption spectrum of said compound.

The transfer is conveniently carried out in the temperature range from 1° to 30° C. The criterion for the choice of transfer temperature is first and foremost the stability of the monofilm present on the surface of the water subphase.

The monofilm present on the surface of the water subphase can be replaced after each immersion, so that different orders of layers can be deposited on the substrate.

The multilayers prepared by the LB technique can thus consist of layers of a material which are in direct sequence or of alternating layers of different layer-forming materials.

The methods of preparing multilayers without applying a potential and the different types of multilayers are known per se to the person skilled in the art of LB systems, and are described, for example, in "Techniques of Chemistry, Physical Methods of Chemistry, Vol. I, Part 3B, pp. 666-671; Editors: A. Weissberger and P. Rossiter".

Suitable solid substrates for the LB technique are a very wide range of substrates having a microscopically planar and electrically conductive surface.

Exemplary of such substrates are metals such as aluminium, copper, silver or gold; semi-conductors such as germanium, silicon or GaAs; inorganic materials which are provided with conductive coatings, for example glass or quartz which is provided, for example, with a metal coating or with a semi-conductor layer, for example with indium-tin oxide (ITO); or plastics materials such as Teflon ®, polyethylene, polymethyl, methacrylate, polystyrene or polyester, which materials are provided with conductive coatings, for example with the above mentioned materials.

It is also possible to use substates which have been made hydrophobic and which have a conductive surface, for example glass or quartz which is provided with a conductive coating and has been pretreated with trichloromethyl silane, dichlorodimethyl silane or trichlorooctadecyl silane.

It is preferred to carry out the process of this invention with electroactive compounds which, in oxidised form, are in the form of radical cations or dications and, in reduced form, are in neutral form.

Such compounds are most preferably compounds of formula I

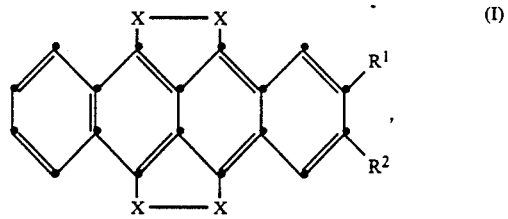

wherein X is S or Se, $R^1$ is $C_1$-$C_{30}$alkyl, —$CF_3$, —O—$R^3$, —S—$R^3$ or —CO—O—$R^3$, $R^2$ is hydrogen, $C_1$-$C_{30}$alkyl, —$CF_3$, —O—$R^3$, —S—$R^3$ or —CO—O—$R^3$, and $R^3$ is $C_1$-$C_{30}$alkyl or partially flourinated or perfluorinated $C_1$-$C_{30}$alkyl.

Among these compounds of formula I, it is preferred to use types in which X is S, $R^1$ is —O—$R^3$ and $R^2$ is hydrogen; or wherein X is S, $R^1$ is —$CF_3$ and $R^2$ is hydrogen.

Further particularly preferred compounds are those of formula II

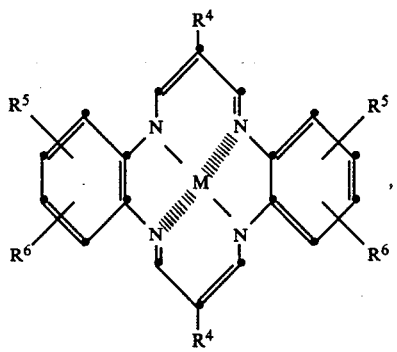
(II)

wherein $R^4$ is hydrogen, $C_1$-$C_{30}$alkyl, unsubstituted phenyl or naphthyl or phenyl or naphthyl each substituted by $C_1$-$C_{12}$alkyl, $C_1$-$C_{12}$alkoxy or $C_1$-$C_{12}$alkylthio, $R^5$ is $C_4$-$C_{30}$alkyl, $C_4$-$C_{30}$alkoxy or $C_4$-$C_{30}$alkylthio, $R^6$ is hydrogen or has the same meaning as $R^5$, and M is a divalent metal atom selected from the group consisting of copper, nickel, iron, cobalt, palladium and platinum, or denotes two hydrogen atoms.

Among these compounds of formula II, it is preferred to use those types wherein M is copper or nickel, $R^4$ is $C_1$-$C_{30}$alkyl, $R^5$ is $C_{10}$-$C_{30}$alkylthio and $R^6$ is hydrogen.

Alkyl radicals may be straight-chain or branched radicals. The straight-chain radicals are preferred.

Alkyl radicals may also have one or more trans-double bonds or triple bonds which are not in 1-position. Several trans-double bonds or triple bonds may be isolated or conjugated with one another.

Depending on the number of carbon atoms in the individual definitions, specific examples of alkyl radicals are: methyl, ethyl, n-propyl, isopropyl, n-butyl, isobutyl, n-pentyl, n-hexyl, n-heptyl, n-octyl, 2-ethylhexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, n-heneicosyl, n-docosyl, n-tetracosyl, n-hexacosyl, n-octacosyl and n-triacontyl, or allyl, propargyl, octadec-9-trans-enyl or pentacosa-10,12-diinyl.

$R^3$, alkyl may also be the appropriate partially fluorinated or perfluorinated alkyl derivatives of this recitation.

$R^4$ as phenyl or naphthyl substituted by alkyl, alkoxy or alkylthio groups of 1 to 12 carbon atoms may be substituted by one or more of said groups, preferably by one such group, in each possible position, preferably in the para-position. In the case of multiple substitution, the sustituents may be the same or different.

The alkyl moieties in $R^5$ and $R^6$ as alkoxy or alkylthio radicals of 4 to 30 carbon atoms or in the $C_1$-$C_{12}$alkoxy or $C_1$-$C_{12}$alkylthio groups as substituents of the phenyl or naphtyl radical $R^4$ may be straight-chain or branched groups, preferably straight-chain groups.

Preferred metals M are copper and nickel.

Some of the compounds of formula I are known. Thus the compounds of formula I, wherein X is S or Se, $R^1$ is —CO—O—$R^3$, $R^2$ is hydrogen or —CO—O—$R^3$ and $R^3$ is ad defined above, can be prepared by methods analogous to those disclosed in German Offenlegugnsschrift No. 3,510,092.

The compounds of formula I, wherein X is S, $R^1$ is alkyl, —CF$_3$, —O—$R^3$ or —S—$R^3$, and $R^2$ is hydrogen, alkyl, —CF$_3$, —O—$R^3$ or —S—$R^3$, can be obtained in accordance with the following reaction scheme:

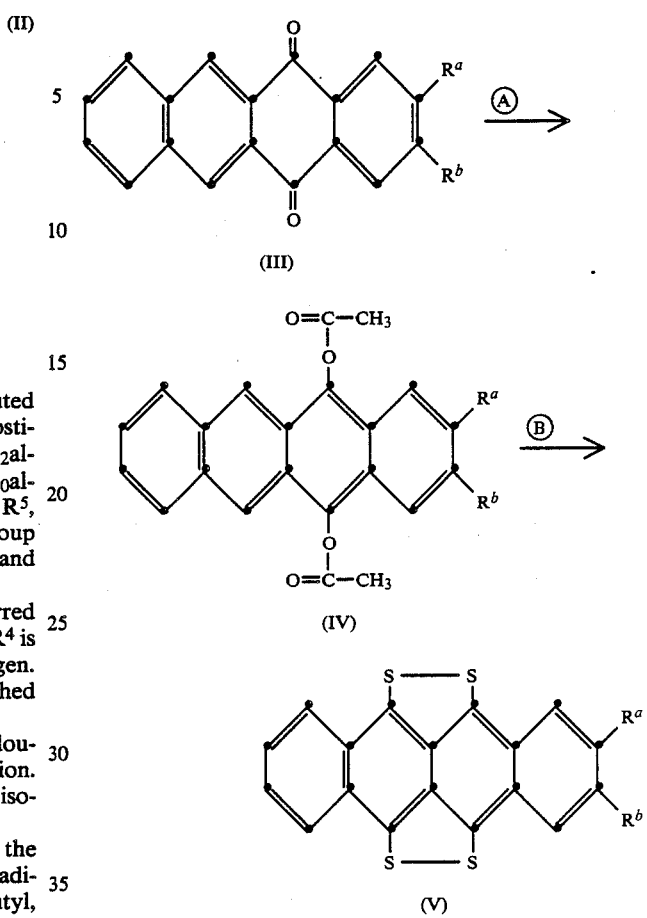

in which formulae above $R^a$ is alkyl, —CF$_3$, —O—$R^3$ or —S—$R^3$ and $R^b$ is hydrogen, alkyl, —CF$_3$, —O—$R^3$ or —S—$R^3$.

In the above reaction scheme the reductive acetylation Ⓐ of the tetracenequinone III is carried out, for example, by reaction with zinc dust in the presence of acetic anhydride, potassium acetate and a polar aprotic solvent such as ethyl acetate. In reaction Ⓐ, the reducing agent will normally be added in excess of stoichiometric proportion, for example in an amount of 2 to 4 mol, based on 1 mol of III.

The reaction of the bis(acetoxy) compound IV to the corresponding TTT derivative V (reaction Ⓑ) is conveniently carried out by heating compound IV with sulfur in the presence of an acid catalyst such as an aromatic sulfonic acid, for example p-toluensulfonic acid.

The reaction of compound IV will normally be carried out in an inert organic solvent. Examples of such solvents are halogenated aromatic hydrocarbons such as dichlorobenzene or trichlorobenzene.

An excess of sulfur is normally used in reaction Ⓑ and the reaction is preferably carried out at the reflux temperature of the respective solvent.

The compounds of formula I, wherein X is Se and $R^1$ and $R^2$ have the meanings as given above for $R^a$ and $R^b$ respectively, can be obtained in accordance with the following reaction scheme:

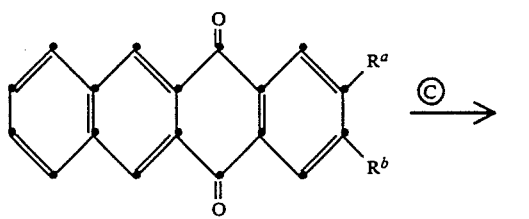

(III)

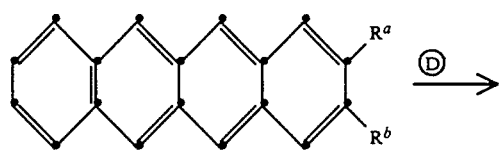

(VI)

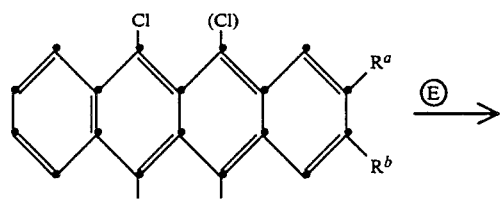

(VII)

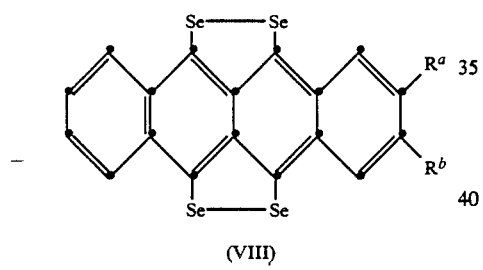

(VIII)

The reduction of the tetracenquinone III to the corresponding tetracene VI (reaction C) may be carried out in a manner known per se by reacting compound III with an excess of a reducing agent, for example zinc dust.

The reaction is preferably carried out in a mixture of glacial acetic acid and potassium acetate. The reaction of the tetracene derivatives VI to the corresponding dichlorotetracene or tetrachlorotetracene VII can be carried out in a manner known per se by reacting compound VI with sulfuryl chloride. Examples of such reactions with analogues compounds will be found in European patent application No. 109 360.

The reaction of compound VII to the TSeT derivative VIII can likewise be carried out by methods analogous to known ones. The reaction is performed by heating the compound of formula VII in the presence of selenium. Examples of such reactions will also be found in European patent application No. 109 360.

The compounds of formula IIIa

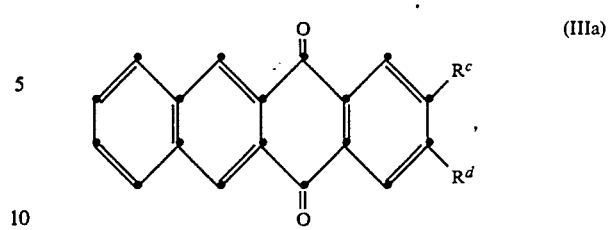

wherein $R^c$ is $-O-R^3$ or $-S-R^3$, $R^d$ has one of the meanings given for $R^c$ or is hydrogen, and $R^3$ is as defined above, can be obtained from 2-fluoro- or 2,3-difluorotetracene-5,12-dione by reaction with $R^3-OH$ or $R^3-SH$ in the presence of potassium carbonate. The reaction is usually conducted in a polar aprotic solvent, for example in dimethyl sulfoxide.

The starting 2-fluorotetracene-5,12-dione is known from European patent application No. 153 905. The 2,3-difluoro derivative can be prepared in a manner similar to that for obtaining the 2-fluoro derivative by using 1,2-difluorobenzene in place of fluorobenzene.

The compounds of formula IIIb

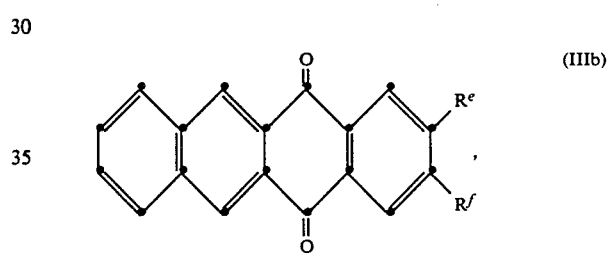

wherein $R^e$ is alkyl and $R^f$ is hydrogen or alkyl, can be obtained by Friedel-Crafts acylation of alkylbenzenes or 1,2-dialkylbenzenes with 2,3-naphthalene-dicarboxylic anhydride and subsequent cyclisation.

Examples of a similar reaction sequence in which fluorobenzene is used in place of an alkylbenzene will be found in European patent application No. 109 360.

The compounds of formula IIIc, wherein $R^g$ is hydrogen, alkyl or $-CF_3$ can be obtained by reaction of the 1,2-dibromobenzocyclobutene IX with the suitably substituted 1,4-naphthoquinone X in accordance with the following reaction scheme:

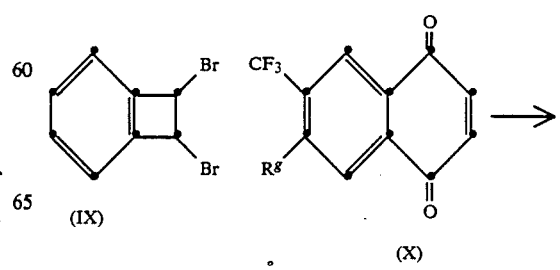

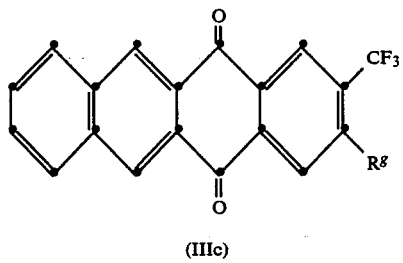

(IIIc)

These reactions are described in Ann. Quim. Ser. C, 81(2), 133–8 (1985). The preparation of the compound IX is also described in this reference.

The compound X can be obtained by Diels-Alder reaction of 1,4-benzoquinone with α-pyrones of formula XI.

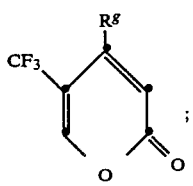

(XI)

wherein $R^g$ is as defined above.

The compounds of formula XI, wherein $R^g$ is hydrogen or —$CF_3$, can be obtained in a manner known per se by reacting known α-pyrone-5-carboxylic acids or diesters of α-pyrone-4,5-dicarboxylic acid with $SF_4$/HF. The α-pyrone starting materials are disclosed, for example, in U.S. Pat. No. 4 617 151.

The compounds of formula XI, wherein $R^g$ is alkyl can be obtained by methods analogous to those disclosed in U.S. Pat. No. 4 617 151 by cyclising compounds of formula XII

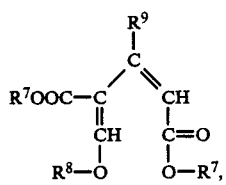

(XII)

wherein $R^7$, $R^8$ and $R^9$ are alkyl radicals, in the presence of strong anhydrous acids, preferably anhydrous formic acid, and subsequently converting the —$COOR^7$ group with $SF_4$ to —$CF_3$.

The compounds of formula XII can be obtained by a process analogous to that disclosed in U.S. Pat. No. 4 617 151 by reacting formates of formula $HCOOR^8$, in the presence of $TiCl_4$, with compounds of formula XIII

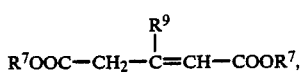

(XIII)

wherein $R^7$ and $R^9$ have the meanings previously assigned to them. The compounds of formula XIII can be prepared starting from per se known diketo esters of formula XIIIa

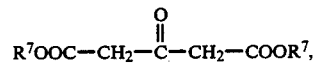

(XIIIa)

wherein $R^7$ is as previously defined.

In this process, a compound of formula XIIIa is reacted with a chlorinating agent, for example with $PCl_3$, $PCl_5$ or $SOCl_2$, to the corresponding dialkyl 2-chlor-prop-1-ene-1,3-dicarboxylate, which is dehydrohalogenated in a manner known per se to the corresponding dialkylallene-1,3-dicarboxylate.

This allene compound is subsequently reacted with a reagent $R^gQ$, wherein Q is an alkali metal, for example Li, Na or K, and $R^g$ is an alkyl radical, in an inert solvent and in the presence of a copper(I) compound, for example CuCN or CuCl, followed by hydrolysis, to give a compound of formula XIII. The reaction temperature is conveniently in the range from −100° to −20° C.

These reactions are preferably conducted in an organic inert and polar solvent, for example in an ether such as tetrahydrofuran, a sulfoxide such as dimethyl sulfoxide, a sulfone such as tetramethylene sulfone, a N-substituted carboxamide, or lactam such as dimethyl formamide or N-methylpyrrolidone.

The compounds of formula II are known per se and can be prepared, for example, by the methods disclosed in European patent application 162 804 or 73 456, or in German Offenlegungsschrift specifications 2 260 761 and 2 214 336.

The layer systems prepared by the processes of this invention may be broadly used as electrical conductors or electroactive components, for example as electrochromic indicators or as sensors.

Accordingly, the invention also relates to the use of the layer systems obtainable in accordance with the practice of this invention for these objects.

The invention is illustrated by the following Examples.

(A) PREPARATORY EXAMPLES

Example 1

Preparation of 2-n-octyloxy-5,6,11,12-tetrathiotetracene (1)

1.1. Preparation of the intermediate 2-n-octyloxy-tetracene-5,12-dione

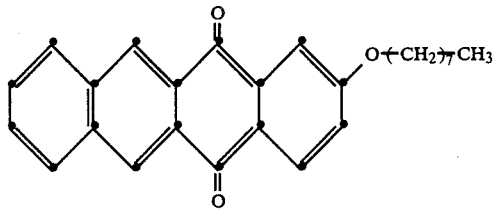

A mixture of 20 g (72.4 mmol) of 2-fluorotetracene-5,12-dione, 94.3 g of octan-1-ol, 30.01 g (217.2 mmol) of anhydrous potassium carbonate and 200 ml of dimethyl sulfoxide is stirred for 20 hours at 100° C. The reaction mixture is cooled, and extracted with toluene/dilute hydrochloric acid. The organic phase is separated, washed with water, dried over sodium sulfate, and concentrated by evaporation. The residue is washed with pentane and recrystallised from cyclohexane. Yield: 22.9 g (82%), m.p. 127°–129° C.

Elemental analysis for $C_{26}H_{26}O_3$ (mol. wt. 386.49): calculated: C 80.80, H 6.78, O 12.42%; found: C 80.68, H 6.89, O 12.57%.

1.2. Preparation of the intermediate 2n-octyloxy-5,12-bis(acetoxy)-tetracene

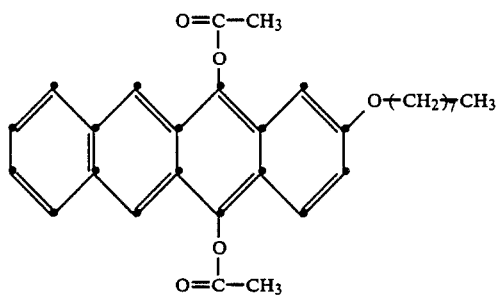

With stirring, 2,0 g (31.05 mmol) of zinc powder are added to a mixture of 4 g (10.35 mmol) of 2-n-octyloxytetracene-5,12-dione obtained in Example 1.1., 40 ml of ethyl acetate, 25 ml of acetic anhydride and 3.05 g (31.05 mmol) of potassium acetate. The mixture is stirred for 40 minutes at 25° C. and then filtered. The residue is washed 4 times with $CH_2Cl_2$. The filtrates are connected by evaporation and the residue is recrystallised from $CH_2Cl_2$/pentane, then from toluene. Yield: 4.1 g (84%), m.p. 107°–111° C.

1.3. Preparation of final product 1

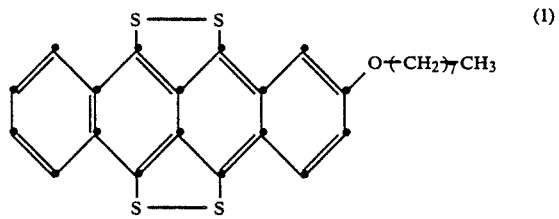

(1)

In a 250 ml flask equipped with reflux condenser and gas inlet pipe, a mixture of 846 mg (183 mmol) of the diacetate of Example 1.2., 507 mg (15.8 mVal) of $S_8$ and 5 mg (0.026 mmol) of p-toluenesulfonic acid is refluxed, under a gentle stream of argon, for 5½ hours in 100 ml of 1,2,4-trichlorobenzene. Thereafter the dark green solution is concentrated under a high vacuum.

The crude product (1.35 g) is purified by flash chromatography through a column of silica gel (240 g of silica gel, φ 7 cm) with $CCl_4$ as eluant. The silica gel must be treated beforehand with $CCl_4$/2% triethylamine and then with pure $CCl_4$ until the eluate is again neutral. The dark green fractions contain the purified 2-n-octyloxy-5,6,11,12-tetrathiotetracene in a yield of 560 mg (65%).

$\lambda_{max}$. (in 1,2,4-trichlorobenzene): 698, 640, 472 nm;

Mass spectrum M+ =480 m/e; the fragmentation accords with the structure.

Example 2

Preparation of the substituted dibenzotetraazaannulene derivative 2

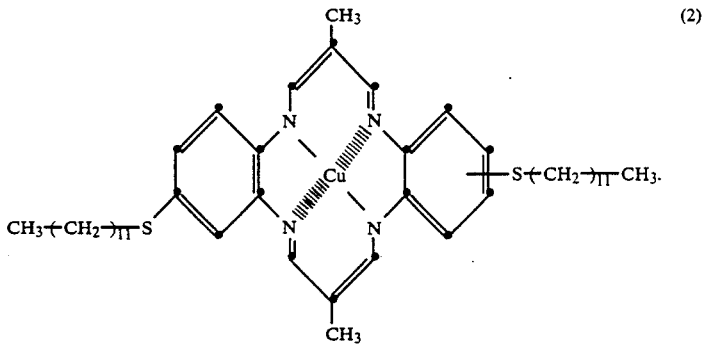

(2)

1 g of copper acetate is dissolved at 60° C. in 25 ml of dimethyl formamide and the solution is saturated with nitrogen. To this solution are added 3.08 g of 4-dodecylthio-1,2-phenylendiamine and the mixture is heated, with stirring, to 100° C. A solution of 1.15 g of 3-ethoxy-2-methylacrolein in 5 ml of dimethyl formamide is then slowly added dropwise at this temperature. The resultant dark brown suspension is stirred for 22 hours at 120° C. and then cooled to 0° C. The brown product is isolated by filtration, washed with ethanol and water, and dried under vacuum at 40° C. Yield: 2.3 g (ca. 60%).

The product is purified by two recrystallisations from dimethyl formamide.

Elemental analysis: calculated: C 67.87, H 8.54, N 7.20, S 8.32, Cu 8.16%; found: C 67.89 H 8.64, N 7.40, S 7.88, Cu 8.34%.

VIS spectrum ($CHCl_3$) 420 (sh), 440, 470 (sh), 499 nm.

Mass spectrum: cluster at 778, 609 (—$C_{12}H_{25}$), 577 (—$SC_{12}H_{25}$).

EXAMPLE 3

Preparation of 2-trifluoromethyl-5,6,11,12-tetrathiotetracene (3)

3.1. Preparation of the intermediate 6-(trifluoromethyl)-1,4-naphthoquinone

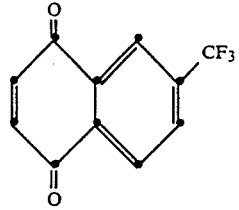

A mixture of 1.64 g (0.01 mmol) of 5-trifluoromethyl-2-oxo-2H-pyrane and 5.4 g (0.05 mol) of 1,4-benzoquinone in 7 ml of 1,2-dichlorobenzene is heated for 12 hours to 180° C. The reaction mixture is then concentrated by evaporation at 90°/20 mbar, and the distillation residue is chromatographed over 150 g of silica gel 60 (eluant: 19:1 mixture of $CH_2Cl_2$/acetone; 0.3 bar overpressure). Yield: 1.82 g (80.52%); m.p. 80°–85° C.

3.2. Preparation of the intermediate 2-trifluoromethyl-tetracene-5,12-dione

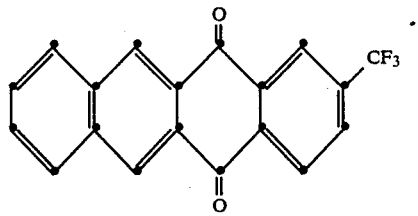

A mixture of 5.65 g (25 mmol) of 6-(trifluoromethyl)-1,4-naphthoquinone, 9.82 g (ca. 37 mmol) of 1,2-dibromobenzocyclobutene (contaminated with a small amount of 2-bromo-1-iodobenzocyclobutene) and 100 ml of xylene is kept for 16 hours under reflux using a water separator. The mixture is cooled and the precipitate is isolated by filtration and washed with xylene. The yield is 5.82 g (71%); m.p. 253°–254° C.

Elemental analysis for $C_{19}H_9F_3O_2$ (mol. wt. 326.27) calculated: C 69.95, H 2.78, F 17.47%; found: C 69.84, H 3.05, F 17.38%.

3.3. Preparation of the intermediate 2-trifluoromethyl-5,12-bis-(acetoxy)tetracene The procedure of Example 1.2. is repeated, replacing 2-n-octyloxytetracene-5,12-dione by 2-trifluoromethyl-tetracene-5,12-dione. Working up in accordance with Example 1.2. gives the desired product in a yield of 91% of theory m.p. 285°–288° C.

3.4. Preparation of the final product 3

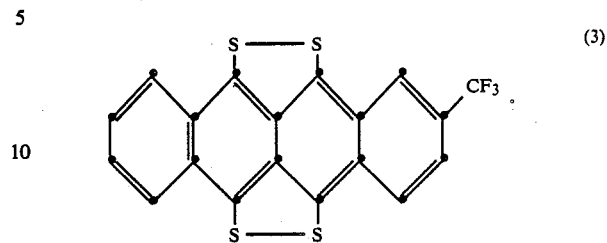

In a 100 ml small flask equipped with reflux condenser and gas inlet pipe, a mixture of 251 mg (0.61 mmol) of the diacetate obtained in Example 3.3., 78 mg (2.43 mVal) of $S_8$ and 2 mg (0.01 mmol) of p-toluenesulfonic acid is refluxed for 20 hours in 35 ml of 1,2,4-trichlorobenzene.

After cooling, the solvent is removed by evaporation under a high vacuum and the residue is extracted with hexane. The black powder is isolated by filtration and dried at 60° C. under high vacuum. Yield: 203 mg (79%) of crude product.

This crude product is sublimed at 190° C. ($10^{-2}$ Pa), to give 67.5 mg (25.6%) of pure 2-trifluoromethyl-5,6,11,12-tetrathiotetracene in the form of black needles.

Mass spectrum: M+ =420; the fragmentation accords with the expected structure.

$\lambda_{max}$ (in 1,2,4-trichlorobenzene): 725, 665, 484 nm.

(B) USE EXAMPLES

Formulae of the compounds used

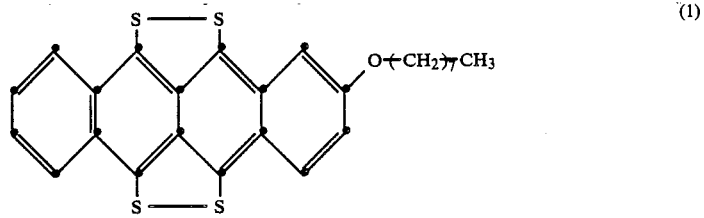

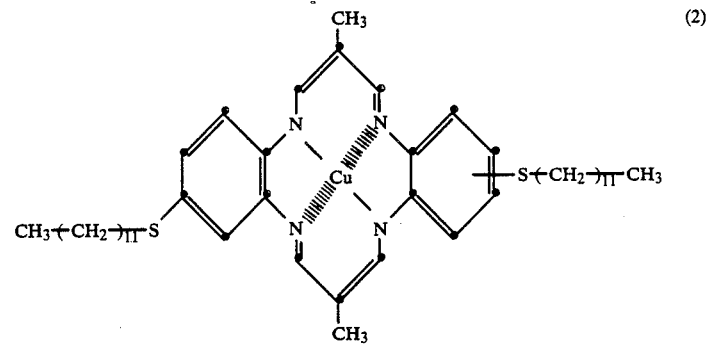

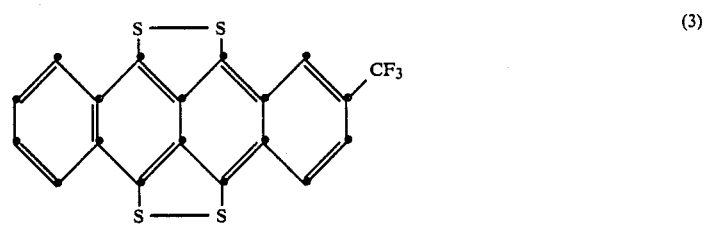

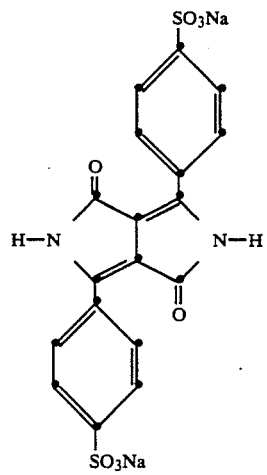 (4)

The preparation of this compound is described in European patent application 224 445

EXAMPLE I

Simultaneous electrochemical oxidation and transfer of monolayers of 2-n-octyloxy-5,6,11,12-tetrathiotetracene 1 and methyl arachidate to current-carrying substrates (conducting salt in the subphase: LiClO$_4$)

A solution of 1 in chloroform is prepared (ca. 0.5 mg/ml) and mixed with a solution of methyl arachidate (MA; Fluka puriss.) in chloroform (ca. 1 mg/ml), such that a mixed solution is obtained. This solution is spread on to the surface of a water subphase in a Langmuir trough at constant temperature (15° C.). A commercially available Langmuir trough is used (Lauda MGW; 70×15×0.6 cm; preparative type). The subphase is a $10^{-3}$ molar solution of LiClO$_4$ (Fluka purum p.a.) in deionised water. This water is purified in a Milli-Q system (ex. Millipore Corp.) (specific resistance of the water $\rho > 18 M\Omega \times cm$). The solvents employed are of spectroscopic quality.

After the spreading of the solution, the monomolecular film which forms is then compressed at a rate of ca. 1.25 cm/min. until a film pressure of $\pi = 20$ mN/m is attained. Constant pressure is maintained until no further decrease of the film area is observed. The film is then transferred by the Langmuir-Blodgett technique to ITO glass plates. The glass plates are coated on one side with indium-tin oxide (ITO) (supplied by Balzers, Liechtenstein). For purification, the ITO glass plates (11×18×1 mm) are ultrasonicated in chloroform. In this treatment, the solvent may not warm to any substantial degree, as otherwise the ITO layer will be destroyed. When transferring the film, an electrical voltage (0.5 to 5 V) is applied to the glass plate during immersion and withdrawal. To transfer the monolayer, a FL-1 film lift (Lauda MGW) is used, and the immersion rate is 2-3 cm/min. The deposited multilayers have a thickness of 15-51 layers and Y-orientation. The counter electrode used for the transfer is a gold wire, which is immersed in the subphase at a distance of 2 cm from the substrate. The substrate is connected as anode. The d.c. source is a PAB model 18-1A power supply unit supplied by Kikusui. The monolayers are transferred in oxidised form to the current-carrying side (ITO side) by immersing and withdrawing the substrate. To determine the oxidation, the multilayer is wiped off the non-conducting reverse side of the substrate, and the multilayer on the ITO side is measured by UV/VIS spectroscopy. The data are listed in Table 1. They show that, at voltages of up to 0.5 V, the compound 1 is transferred mainly as radical cation and, at voltages above 0.5 V, as dication.

EXAMPLE II

Simultaneous electrochemical oxidation and transfer of monolayers of 1 and methyl arachidate to current-carrying substrates (conducting salt in the subphase: KPF$_6$)

The procedure described in Example I is repeated, using in place of LiClO$_4$ a $10^{-3}$ molar solution of KPF$_6$ in Millipore water as subphase. 31 monolayers are transferred to ITO glass plates at a voltage of 0.5 and 1.5 V. To determine the oxidation, the multilayer on the non-conducting reverse side of the substrate is wiped off, and the multilayer on the ITO side is measured by UV/VIS spectroscopy. The data are listed in Table 1. The absorption maximum values show that, at low voltage (ca. 0.5 V), compound 1 is transferred as radical cation salt and, at high voltage (ca. 1.5 V), as dication salt.

EXAMPLE III

Simultaneous electrochemical oxidation and transfer of monolayers of 1 and methyl arachidate to current-carrying substrates (conducting salt in the subphase: sodium dodecyl sulfate)

The procedure described in Example I is repeated, using in place of LiClO$_4$ a $10^{-3}$ molar solution of sodium dodecyl sulfate (Merck; "for biochemical purposes and surfactant investigations") in Millipore water (pH=5.95). After compressing the monolayer to a film pressure of 20 mN/m, a subsequent strong expansion of the monolayer is here always observed. This phenomenon is probably attributable to the penetration of dodecyl sulfate anions into the film.

When expansion is complete, 31 monolayers are transferred to ITO glass plates at a voltage of 0.5 and 1.5 V. To determine the oxidation, the multilayer on the non-conducting reverse side of the substrate is wiped off, and the multilayer on the ITO side is measured by UV/VIS spectroscopy. The data are listed in Table 1. The absorption maximum values show that, at low voltage (ca. 0.5 V), compound 1 is transferred as radical cation salt and, at high voltage (ca. 1.5 V), as dication salt.

EXAMPLE IV

Simultaneous electrochemical oxidation and transfer of monolayers of 1 and methyl arachidate to current-carrying substrates (conducting salt in the subphase: disodium diketopyrrolopyrrole disulfonate 4)

The procedure described in Example I is repeated, using in place of LiClO$_4$ a $10^{-4}$ molar solution of 4 in Millipore water (pH=5.85). 31 monolayers are deposited on ITO glass plates at a voltage of 1.5 V.

To determine the oxidation, the multilayer is wiped off the non-conducting reverse side of the substrate, and the multilayer on the ITO side is measured by UV/VIS spectroscopy. The data are listed in Table 1. They show that compound 1 is transferred in the form of the dication salt and the diketopyrrolopyrrole sulfonate dianion is incorporated as counterion in the multilayer.

EXAMPLE V

Simultaneous electrochemical oxidation and transfer of monolayers of 1 to current-carrying substrates (conducting salt in the subphase: sodium dodecyl sulfate)

The procedure described in Example III is repeated, except that a monolayer of pure 1 (prepared as described in Example 1) is used.

31 monolayers are deposited at a voltage of 1.5 V. In the course of simultaneous transfer and oxidation, the alkyl sulfate counterions are incorporated in the layers of 1.

To determine the oxidation, the multilayer is wiped off the non-conducting reverse side of the substrate, and the multilayer on the ITO side is measured by UV/VIS spectroscopy. The absorption maximum at $\lambda_{max.}=485$ nm ($\epsilon=35100$ cm$^{-1}$) shows that 1 has been transferred substantially as dication.

EXAMPLE VI

Simultaneous electrochemical oxidation and transfer of monolayers of 2 to current-carrying substrates (conducting salt in the subphase: LiClO$_4$)

The procedure described in Example I is repeated, except that a monolayer of 2 and methyl arachidate (mixture ratio 70:30 mol %) prepared in accordance with Example I is used. A voltage of 1.5 V is applied to the ITO glass pate during the film transfer. 31 layers are transferred.

To determine the oxidation, the multilayer is wiped off the non-conducting reverse side of the substrate, and the multilayer on the ITO side is measured by UV/VIS spectroscopy. The absorption maximum at $\lambda_{max}=380$ nm ($\epsilon=60500$ cm$^{-1}$) shows that the molecules 2 have been transferred in oxidised form.

EXAMPLE VII

Simultaneous electrochemical oxidation and transfer of monolayers of 3 to current-carrying substrates (conducting salt in the subphase: sodium dodecyl sulfate)

The procedure described in Example III is repeated, using a monolayer of pure 3 which is prepared in accordance with Example I.

31 monolayers are deposited on ITO glass plates at a voltage of 1.5 V. During the simultaneous transfer and oxidation, the alkyl sulfate counterions are incorporated in the layers of 3. To determine the oxidation, the multilayer is wiped off the non-conducting reverse side of the substrate, and the multilayer on the ITO side is measured by UV/VIS spectroscopy. The absorption maximum values at $\lambda_{max.}=500$ nm ($\epsilon=41700$ cm$^{-1}$) and 460 nm ($\epsilon=52700$ cm$^{-1}$) show that 3 has been transferred substantially as dication.

| Multilayer of Example | Voltage [V] | Number of layers transferred | $d_{001}$—value* [nm] | $\lambda_{max}$ [nm] | $(\epsilon)$** ([cm$^{-1}$]) |
|---|---|---|---|---|---|
| I | 0.5 | 51 | 3.95 | 570 | (16'500) |
| I | 1.0 | 15 |  | 550 | (13'300) |
|   |     |    |  | ~470 sh |  |
| I | 2.0 | 51 | 3.92*** | 550 | (15'700) |
|   |     |    |  | ~470 sh |  |
| I | 3.0 | 15 |  | 550 | (14'000) |
|   |     |    |  | ~470 sh |  |
| I | 5.0 | 15 |  | 550 | (9'500) |
|   |     |    |  | ~470 sh |  |
| II | 0.5 | 31 |  | 590 | (9'500) |
| II | 1.5 | 31 |  | 550 | (8'600) |
|    |     |    |  | 470 | (8'100) |
| III | 0.1 | 31 |  | 570 | (6'200) |
| III | 0.5 | 31 |  | 560 | (4'600) |
|     |     |    |  | 485 | (4'400) |
| III | 1.5 | 31 |  | 560 sh |  |
|     |     |    |  | 485 | (20'200) |
| IV | 1.5 | 31 |  | 530 | (9'100) |
|    |     |    |  | 490 | (7'700) |

*Bilayer spacing determined by X-ray small angle scattering. Up to 5 reflex orders are observed.
**$\epsilon$ is calculated on the basis of a bilayer spacing of 3.95 nm
***The samples are inhomogeneous. Further layer spacings of 5.96 and 4.89 nm are measured.

What is claimed is:

1. A process for the preparation of Langmuir-Blodgett layer systems (LB systems), comprising the steps of
   (i) preparing a monomolecular layer of an electroactive compound containing a cyclic conjugated $\pi$-system which can be electrochemically oxidised or reduced, or of a mixture of said compound in conjunction with further amphiphilic compounds that are capable of stabilising monomolecular layers,
   (ii) transferring said layer from a subphase which contains an electrolyte, and into which a counter electrode is dipped, to a solid substrate having an electrically conductive surface by dipping said substrate through the layer so as to effect transfer of the layer to the substrate which is connected as anode or cathode, the potential applied being so chosen that a salt forms from said electroactive compound and counterions of the subphase.

2. A process according to claim 1, wherein the electroactive compound is in the oxidised form as radical cation or dication, and in the reduced form in neutral form.

3. A process according to claim 2, wherein the electroactive compound is a compound of formula I

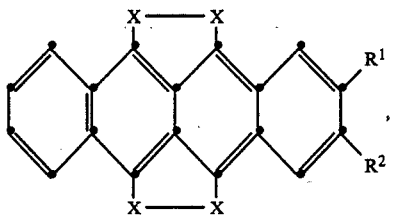

(I)

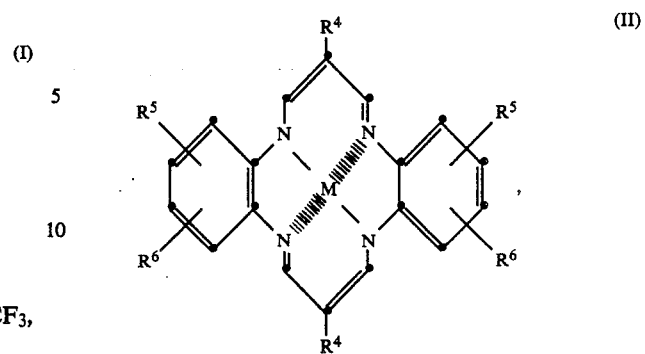

(II)

wherein X is S or Se, $R^1$ is $C_1$-$C_{30}$alkyl, —$CF_3$, —O—$R^3$, —S—$R^3$ or —CO—O—$R^3$, $R^2$ is hydrogen, $C_1$-$C_{30}$alkyl, —$CF_3$, —O—$R^3$, —S—$R^3$ or —CO—O—$R^3$, and $R^3$ is $C_1$-$C_{30}$alkyl or partially fluorinated or perfluorinated $C_1$-$C_{30}$alkyl.

4. A process according to claim 3, wherein X is S, $R^1$ is —O—$R^3$ and $R^2$ is hydrogen; or wherein X is S, $R^1$ is —$CF_3$ and $R^2$ is hydrogen.

5. A process according to claim 2, wherein the electroactive compound is a compound of formula II wherein $R^4$ is hydrogen, $C_1$—$C_{30}$alkyl, unsubstituted phenyl or naphthyl or phenyl or naphthyl each substituted by $C_1$-$C_{12}$alkyl, $C_1$-$C_{12}$alkoxy or $C_1$-$C_{12}$alkylthio, $R^5$ is $C_4$-$C_{30}$alkyl, $C_4$-$C_{30}$alkoxy or $C_4$-$C_{30}$alkylthio, $R^6$ is hydrogen or has the same meaning as $R^5$, and M is a divalent metal atom selected from the group consisting of copper, nickel, iron, cobalt, palladium and platinum, or denotes two hydrogen atoms.

6. A process according to claim 5, wherein M is copper or nickel, $R^4$ is $C_1$-$C_{30}$alkyl, $R^5$ is $C_{10}$-$C_{30}$alkylthio and $R^6$ is hydrogen.

* * * * *